Feb. 9, 1932.  G. F. DE WEIN  1,844,641
VALVE PACKING
Filed May 31, 1928
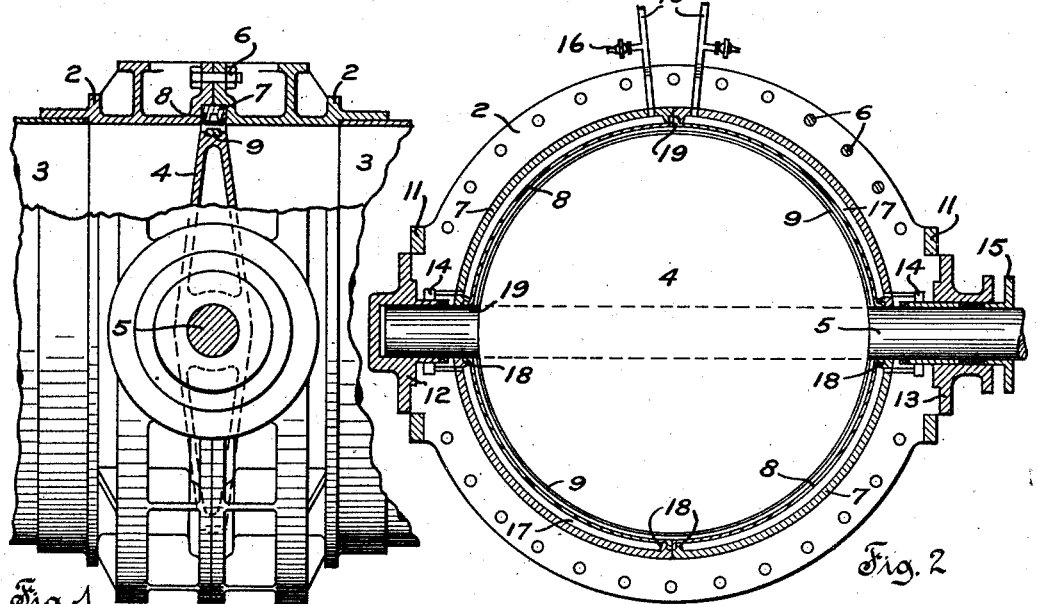
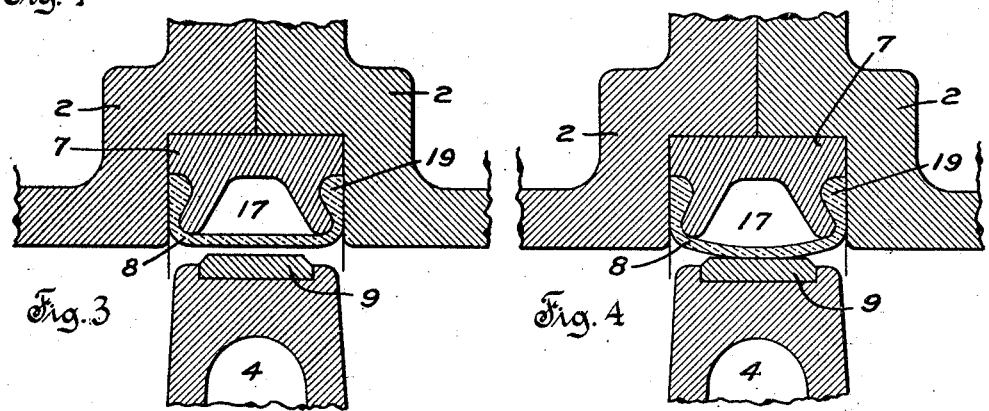
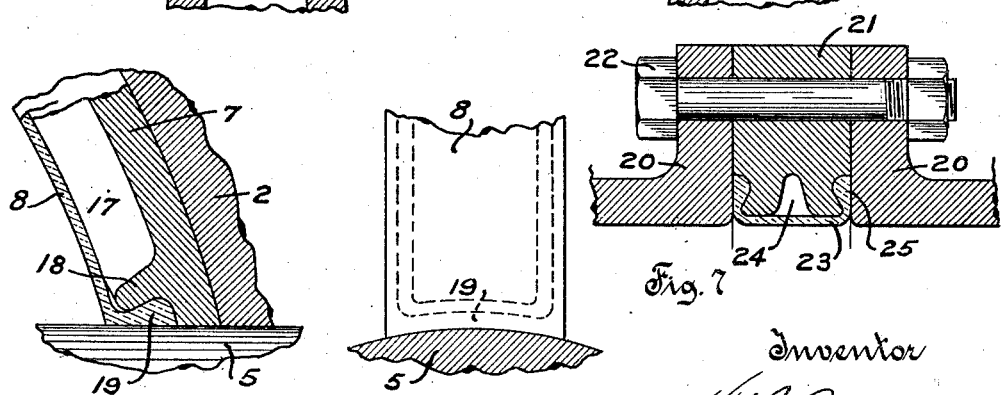
Inventor Patented Feb. 9, 1932

1,844,641

UNITED STATES PATENT OFFICE

GEORGE F. DE WEIN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

VALVE PACKING

Application filed May 31, 1928. Serial No. 281,699.

The present invention relates generally to improvements in valve packings which are especially applicable to butterfly valves of large diameter or to such valves when subjected to high pressure fluid.

An object of the invention is to provide a simple, compact and highly efficient packing for preventing leakage of fluid past a valve when in closed position. Another object of the invention is to provide an improved sealing device which is especially adapted for application to hydraulic valves of the butterfly type. A further object of the invention is to provide a readily renewable packing for butterfly valves or the like, which will not interfere with the normal movement of the valve disk. Still another object of the invention is to provide a butterfly valve packing which will prevent leakage of fluid past the valve adjacent to the valve stem, as well as at the remaining peripheral portions of the valve. These and other objects of the invention will be apparent from the following description.

Some of the novel features of butterfly valve packings, disclosed but not specifically claimed herein form the subject of a copending application Serial No. 137,915, filed September 27, 1926.

A clear conception of several embodiments of the present improvement and of the mode of actuating devices constructed in accordance therewith, may be had by referring to the drawings accompanying and forming a part of this specification in which like reference characters designate the same or similar parts in the various views.

Fig. 1 is a part sectional side elevation of a butterfly valve having one form of the improved packing applied thereto.

Fig. 2 is a transverse vertical section through the valve casing in the plane of the valve disk, of the butterfly valve and packing device illustrated in Fig. 1.

Fig. 3 is a fragmentary enlarged section through the butterfly valve and packing, showing the valve disk in closed position just prior to the application of the sealing pressure to the packing.

Fig. 4 is an enlarged fragmentary sectional view through the butterfly valve and packing, showing the valve disk in closed position with the sealing pressure applied to the packing.

Fig. 5 is an enlarged fragmentary sectional view through the valve casing and packing adjacent to the valve actuating stem.

Fig. 6 is an enlarged fragmentary sectional view taken transversely through the valve stem adjacent to the end of one of the packing segments.

Fig. 7 is an enlarged fragmentary sectional view through the modified form of valve casing and packing.

Referring specifically to Figs. 1 and 2, the butterfly valve comprises generally a main casing composed of end coacting similar sections 2 and forming a substantially cylindrical conduit communicating with fluid conducting pipe lines 3; a disk valve member 4 oscillatable about an axis within the conduit formed by the casing sections 2; and an actuating shaft 5 for the disk member 4, spanning the valve casing and rotatably supporting the disk member 4 within the casing.

The shaft 5 is rotatably mounted in bearings 12, 13 and has one end thereof penetrating a stuffing box 15 so as to permit application of the valve actuating forces while avoiding escape of fluid. The casing sections 2 are rigidly united by means of clamping bolts 6 and shrink rings 11, and cooperate to provide an annular internal recess. The disk member 4 is provided with a peripheral seating 9 which is located directly opposite to the recess in the valve casing as shown in Figs. 3 and 4, when the valve disk member 4 is in closed position.

Located within the annular recess of the valve casing is a segmental ring 7 which is provided with an annular groove 17 facing the interior of the conduit. An annular segmental elastic packing 8 is provided with a substantially cylindrical portion which spans the casing recess and the groove 17, the sides of the packing 8 being provided with enlarged outwardly projecting retainers 19 which are clamped in position between the ring 7 and the casing sections 2. The packing 8 and the ring 7 may be formed of several segments as shown, and the ends of the segments of the ring 7 are preferably provided with inclined projections 18 for locking the end retainers 19 of the packing segments against each other and against the main shaft 5 as shown in Figs. 5 and 6. The portions of the grooves 17 directly adjacent to the shaft 5 and located on opposite sides thereof, are interconnected by means of fluid passages 14 surrounding the shaft and connected to the grooves 17 by means of lateral passages as shown in Fig. 2. Fluid under pressure may be admitted to and released from the groove 17, through pipes 10 which may be provided with air escape valves or cocks 16 in order to insure complete filling of the grooves 17 with the pressure liquid.

In the modified construction of the packing illustrated in Fig. 7, the valve casing is composed of a pair of sections 20 and an intervening ring 21. The annular elastic packing 23 spans the gap between the casing sections 20, and encloses an annular recess 24 formed in the ring 21. The packing 23 is provided with thickened side retainers 25 which are clamped between the ring 21 and the adjacent casing sections 20 when the clamping bolts 22 are applied in order to rigidly unite the parts.

When the butterfly valve disk member 4 is in open position the pressure within the groove 17 is released through the pipes 10 and the packing 8 is positioned entirely within the casing recess, so as to avoid interference with the flow of fluid through the main conduit, and to also avoid interfering with the closing movement of the valve disk 4. In closing the valve, the disk member 4 is first brought to closed position as shown in Fig. 3 with the seating 9 directly opposite to the groove 17, by applying force to the actuating shaft 5. When the valve has been thus positioned, fluid under pressure may be applied within the groove 17, to distort the packing 8 as shown in Fig. 4 and to thereby effectively seal the valve against leakage. The application of fluid under pressure to the groove 17 will also act to expand the sections of the packing 8 longitudinally thereby forcing the ends of the packing sections into intimate contact with each other and with the adjoining shaft 5, and positively preventing escape of fluid past any portion of the valve disk 4.

The operation of the modified form of packing disclosed in Fig. 7 is identical with that disclosed in Figs. 3 and 4, and it will be apparent that in smaller valves the packings and the retaining rings may be formed of a minimum number of sections. In certain types of valves wherein the peripheral edge of the valve is uninterrupted by the actuating shaft, the packings and the retaining rings therefore, may obviously be made continuous. The packing is preferably formed of material such as soft rubber, and may be readily renewed by separation of the casing sections. The air cocks 16 are located at the highest portions of the pressure spaces thereby insuring free escape of all air and permitting filling of the spaces with incompressible fluid. It will be noted that the invention provides an extremely simple and compact packing especially applicable to butterfly valves.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a sectional casing forming a recess, an elastic packing spanning said recess and having enlarged portions cooperating with the recess side walls, a ring engaging said enlarged packing portions, means for simultaneously clamping the sections of said casing and said ring together to lock said packing within said recess, and a disk valve member movable within said casing into close proximity with said packing.

2. In combination, a sectional casing forming a recess, an elastic packing spanning said recess and having enlarged portions cooperating with the recess side walls, a ring engaging said enlarged packing portions, means for simultaneously clamping the sections of said casing and said ring together to lock said packing within said recess, a disk valve member movable within said casing into close proximity with said packing, and means for admitting fluid under pressure to said packing to expand the same into intimate engagement with said disk valve member.

3. In combination, a casing comprising adjoining annular sections having a recess therebetween, a ring member located within said recess and having a groove facing the interior of said casing, an elastic packing spanning said groove, a disk valve member movable within said casing to a position wherein the periphery of said valve member is disposed closely adjacent to said packing, and means for admitting fluid under pressure to said groove to expand said packing against said disk periphery.

4. In combination, a casing member forming a conduit, a movable valve member therein, one of said members having a recess, an annular element located within said recess and having a groove therein located opposite a peripheral portion of said other member when the valve member is in closed position, and an elastic packing spanning said groove and having portions held against the recess side walls by said annular element.

5. In combination, a casing member forming a conduit, a movable valve member therein, one of said members having a recess, an annular element located within said recess and having a groove therein located opposite a peripheral portion of said other member when the valve member is in closed position, an elastic packing spanning said groove and having portions held against the recess side walls by said annular element, and means for admitting fluid under pressure to said groove to expand said packing.

6. In combination, a casing member forming a conduit, a disc valve member within said conduit and having a peripheral portion movable toward and away from the interior surface of said casing member, one of said members having a seating and the other having a recess opposite which said seating is located when said disc member is in closed position, an elastic packing comprising a substantially cylindrical portion extending along said conduit to span said recess and side portions extending away from said cylindrical portion, means for clamping said side portions against the recess side walls, and means for admitting fluid under pressure to said recess to expand said packing into intimate engagement with said seating.

7. In combination, a casing member forming a cylindrical conduit, a disc valve member oscillatable within said conduit about an axis spanning the same and having a peripheral portion movable toward and away from the interior surface of said casing member, one of said members having an annular seating and the other having an annular recess opposite which said seating is located when said disc member is in closed position, an annular elastic packing of U-section comprising a substantially cylindrical portion extending along said conduit to span said recess and substantially plane side portions extending away from said cylindrical portion, means for clamping said side portions against the recess side walls, and means for admitting fluid under pressure to said recess to expand said cylindrical packing portion into intimate engagement with said seating.

8. In combination, a casing member forming a conduit, a disc valve member within said conduit and having a peripheral portion movable toward and away from the interior surface of said casing member, said valve member having a seating and said casing member having a recess opposite which said seating is located when said valve member is in closed position, an elastic packing comprising a substantially cylindrical portion extending along said conduit to span said recess and side portions extending outwardly from said cylindrical portion, means for clamping said side portions against the recess side walls, and means for admitting fluid under pressure to said recess to expand said packing into intimate engagement with said seating.

9. In combination, a casing member forming a cylindrical conduit, a disc valve member oscillatable within said conduit about a shaft spanning the same, said valve member having a peripheral seating and said casing member having an annular recess opposite which said seating is located when said disc member is in closed position, an annular elastic packing of U-section comprising a substantially cylindrical portion extending along said conduit to span said recess and outwardly extending parallel side portions, means for clamping said side portions against the recess side walls, and means for admitting fluid under pressure to said recess to expand said cylindrical packing portion into intimate engagement with said seating.

10. In combination, a casing member forming a conduit, a disc valve member within said conduit and having a peripheral portion movable toward and away from the conduit bounding surface, one of said members having a seating and the other having a recess located closely adjacent to said seating when said valve member is in closed position, an elastic packing of U-shaped cross section spanning said recess and having side flanges cooperating with the recess side walls, an element within said recess engaging said side packing flanges to hold said packing in place, and means for admitting fluid under pressure to said recess to expand said packing into intimate engagement with said seating.

11. In combination, a casing member forming a conduit, a disc valve member within said conduit and having a peripheral seating movable toward and away from the conduit bounding surface, said casing member having a recess located closely adjacent to said valve member seating when the latter is in closed position, an elastic packing of U-shaped cross section spanning said recess and having side flanges cooperating with the recess side walls, an element within said recess engaging said side packing flanges to hold said packing in place, and means for admitting fluid under pressure to said recess to expand said packing into intimate engagement with said valve member seating.

12. In combination, a casing member forming a conduit, a disc valve member within said conduit, and having a peripheral portion movable toward and away from the conduit bounding surface, one of said members having a seating and the other having a recess located closely adjacent to said seating when said valve member is in closed position, an elastic packing of U-shaped cross section spanning said recess and having side flanges cooperating with the recess side walls, and an element within said recess engaging said side packing flanges to hold said packing in place.

13. In combination, a casing member forming a conduit, a disc valve member within said conduit and having a peripheral seating movable toward and away from the conduit bounding surface, said casing member having a recess located closely adjacent to said valve member seating when the latter is in closed position, an elastic packing of U-shaped cross section spanning said recess and having side flanges cooperating with the recess side walls, and means within said recess engaging said side packing flanges to hold said packing in place.

In testimony whereof, the signature of the inventor is affixed hereto.

G. F. DE WEIN.